Figure 1:
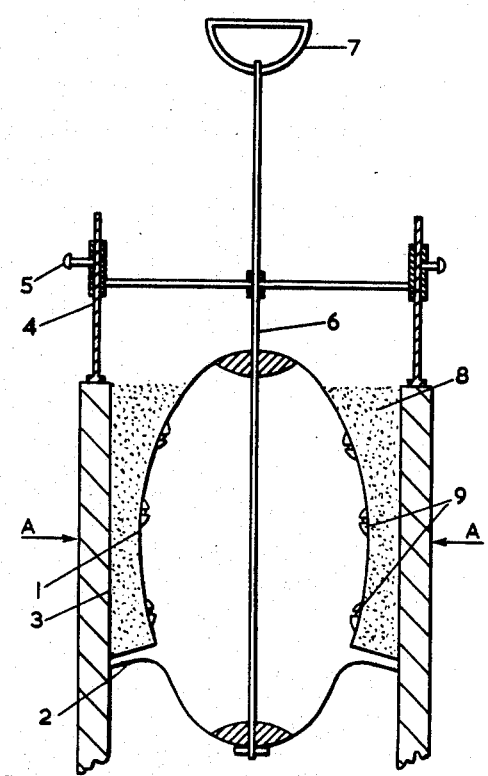

Feb. 1, 1966 H. S. NEWTON 3,231,947
INFLATABLE FORMER FOR THE MANUFACTURE OF HOT TOPS
Filed April 29, 1963

Henry S. Newton
Inventor
By Wenderoth, Lind and Ponack, attorneys

3,231,947
INFLATABLE FORMER FOR THE MANUFACTURE OF HOT TOPS

Henry Swift Newton, Brixham, England, assignor to The Distillers Company Limited, Edinburgh, Scotland, a British company
Filed Apr. 29, 1963, Ser. No. 276,492
Claims priority, application Great Britain, May 18, 1962, 19,242/62
2 Claims. (Cl. 22—9)

The present invention concerns improvements in or relating to the casting of metals.

British patent specification 778,039 describes a method of manufacturing hot tops of the type which converge towards the top end for moulds for casting ingots of steel or other metal, comprising introducing a collapsible or demountable template into a mould, bringing said template into contact with the inside of the mould, supplying a hot top mass between the template and the mould wall, collapsing or taking apart the template and lifting the template out of the mould. The templates of this patent specification are rigid structures. For instance a template is claimed comprising a hood converging upwards and composed of at least three separate plates, the lower edge of the hood being shaped in accordance with the horizontal cross-section of the mould in which the template is to be used or the riser to be formed, and each of said plates being arranged to swing in so far towards the central axis of the hood as to enable the template to be removed from the mould or riser after supplying the hot top or riser mass, without damaging the hot top or riser.

It is an object of the present invention to provide an improved apparatus for manufacturing hot tops for moulds used in casting ingots of steel or other metals.

One embodiment of the present invention comprises introducing into a mould, a bag which can be inflated to give, in combination with the mould wall, a cavity having the desired shape of the hot top, inflating the bag so that it contacts the inside wall of the mould, forming the hot top between the bag and the mould wall, deflating the bag and removing it from the mould.

The invention is further an inflatable former or a bag suitable for use in the process of the present invention.

Any fluid can be used to inflate the former or bag provided that it does not react with the material from which the former or bag is manufactured. The preferred fluid is gaseous carbon dioxide.

The shape of the cavity made by the inflated former or bag in combination with the inner wall of the mould can vary widely thus providing means for manufacturing hot tops having any desired shape. It is preferred to have a cavity so shaped as to form a hot top imparting a configuration on the cast ingot which allows it to be readily processed by conventional techniques.

The hot top can be formed from inexpensive material such as silica sand, granulated slag, limestone or the like combined with an adhesive or mixed with suitable chemical agents for hardening such as for example according to the known carbon dioxide process. When using the carbon dioxide process in the present invention a small amount of water glass is admixed with the mass from which the hot top is to be formed and the mixture supplied to the cavity made by the inflated bag in combination with the inner wall or the mould. The mixture is then hardened by applying gaseous carbon dioxide to it. The carbon dioxide can be applied by any suitable means.

In a preferred modification of the present invention the bag is made porous on that surface which will contact the mass from which the hot top is formed. Thus when the bag is inflated with carbon dioxide it can escape into the mass and harden it by the standard carbon dioxide process. Most suitably the bag is so made that it does not become porous until the carbon dioxide used to inflate the bag has reached sufficient pressure both to maintain the bag in its inflated shape and to supply carbon dioxide to the mass at a suitable pressure. A pressure of about 40 lbs./sq. in. is particularly useful. The bag can be made porous by incorporating valves in its walls which can be opened to allow the carbon dioxide to diffuse into the mass of the hot top when any suitable pressure has been reached.

Bags suitable for use in the present invention can be made from any flexible material. Plastics materials such as for example synthetic or natural rubbers or polyvinyl chloride are particularly suitable. The bag is preferably so shaped when inflated as to have a rim near or at its lower end which makes a seal with the inner wall of the mould and defines the lower edge of the hot top.

The process according to the present invention can also be applied to form a riser in the manufacture of castings of steel or any other metal. This is carried out by forming a rammed mass around an inflated former or bag of the desired shape, and then deflating and removing the former or bag.

Figure 2:
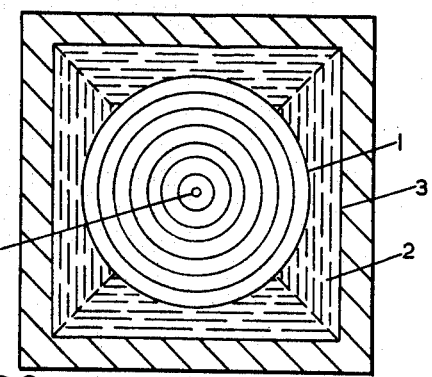

An embodiment of the apparatus according to the present invention is now described with reference to the drawing in which FIGURE 1 shows a longitudinal section of an inflatable former in position in a mould and FIGURE 2 shows a cross section of FIGURE 1 along the line A—A. The inflatable former 1 made from nylon coated with neoprene is shown inflated when it is roughly ellipsoid in shape, with a rim 2 near its lower end which forms a seal with the inside wall 3 of the mould. It is provided with valves 9 which can be opened to allow the fluid used to inflate the former to diffuse out of the former. The former is supported by a framework 4 which has adjustable clamps 5 for adjusting the position of the former in the mould. A tube 6 is sealed into the former. The tube is perforated at points within the former and it has an inlet valve 7 at its upper end through which fluids can be passed into the former. A hot top 8 is shown in the cavity formed by the former and the mould wall.

In the process for making a hot top the inflatable former 1 is introduced into the mould and suspended in the desired position by suitable adjustment of the clamps 5 on the framework 4. The former is inflated by passing carbon dioxide gas into it through the inlet valve 7 and the tube 6 until a pressure of 40 lbs. per square inch has been reached. The hot top is then formed between the mould wall 3 and the former from a mixture of silica sand and water glass. This mixture is hardened by opening the valves 9 and allowing carbon dioxide gas to diffuse from the former into the hot top mass. The valves operate automatically when the pressure inside the former is greater than 40 lbs. per square inch. When the mass of the hot top is hardened the former is deflated by opening the inlet valve 9 to allow the gas to be removed from the former. The former is then removed from the mould.

I claim:
1. An inflatable former for use in the manufacture of hot tops for moulds used in casting ingots of metal, which comprises a bag having an annular flange and valves, said flange being inflatable into sealing contact with part of the mould wall and said bag being inflatable into substantially contiguous but spaced relationship with the remainder of said mould wall, thereby defining a cavity between the bag and mould wall, said cavity constituting a receptacle for hot top forming material, said bag having sufficient rigidity to support hot top forming material in said cavity, and said valves being provided with release means to release fluid from said bag into said cavity.

2. A former as claimed in claim 1 wherein the bag is made from nylon coated with neoprene.

References Cited by the Examiner

UNITED STATES PATENTS

| | | |
|---|---|---|
| 54,204 | 4/1866 | Presbrey. |
| 720,718 | 2/1903 | Maddock et al. |
| 3,077,646 | 2/1963 | Tigerschiold. |
| 3,095,618 | 7/1963 | Roussos. |
| 3,171,169 | 3/1965 | Graef _____ 22—9 |

FOREIGN PATENTS 694,763  9/1964  Canada.

J. SPENCER OVERHOLSER, *Primary Examiner.*

MARCUS U. LYONS, *Examiner.*